(12) United States Patent  
Fleury

(10) Patent No.: US 7,284,078 B2
(45) Date of Patent: Oct. 16, 2007

(54) DETERMINISTIC FIELD BUS AND PROCESS FOR MANAGING SAME SUCH THAT WHEN TRANSMISSIONS FROM ONE SUBSCRIBER STATION ARE ENABLED TRANSMISSIONS FROM OTHER SUBSCRIBER STATIONS ARE DISABLED

(75) Inventor: Christophe Fleury, Vacquiers (FR)

(73) Assignee: Airbus France, Toulouse, Cedex (FR)

( * ) Notice: Subject to any disclaimer, the term of this patent is extended or adjusted under 35 U.S.C. 154(b) by 202 days.

(21) Appl. No.: 10/256,846

(22) Filed: Sep. 26, 2002

(65) Prior Publication Data

US 2003/0058882 A1 Mar. 27, 2003

(30) Foreign Application Priority Data

Sep. 27, 2001 (FR) ................... 01 12427

(51) Int. Cl.
*G06F 1/00* (2006.01)

(52) U.S. Cl. ............. 710/107; 710/110; 710/106; 709/201; 709/203

(58) Field of Classification Search ........ 710/305–306, 710/104–107, 110–113, 309, 36–38; 714/18, 714/21, 43; 370/445, 462; 709/201–203
See application file for complete search history.

(56) References Cited

U.S. PATENT DOCUMENTS

| | | | |
|---|---|---|---|
| 4,785,396 A * | 11/1988 | Murphy et al. ............. 710/106 |
| 5,434,861 A * | 7/1995 | Pritty et al. .................. 370/449 |
| 5,526,213 A * | 6/1996 | MacLauchlan et al. ....... 361/45 |
| 5,574,848 A * | 11/1996 | Thomson ...................... 714/2 |
| 5,761,451 A * | 6/1998 | Abert et al. ................. 710/113 |
| 5,781,585 A * | 7/1998 | Dorner et al. ............. 375/224 |
| 5,958,029 A * | 9/1999 | McKinnon ................... 710/100 |
| 5,980,078 A * | 11/1999 | Krivoshein et al. ............. 700/1 |
| 6,111,888 A * | 8/2000 | Green et al. ................ 370/461 |
| 6,467,039 B1 * | 10/2002 | Fredriksson ................ 713/151 |
| 6,757,766 B1 * | 6/2004 | Hutner et al. ............... 710/107 |
| 6,757,777 B1 * | 6/2004 | Griessbach et al. ......... 710/316 |
| 2003/0115369 A1 * | 6/2003 | Walter et al. ................ 709/253 |
| 2003/0158983 A1 * | 8/2003 | Dalakuras et al. .......... 710/107 |
| 2003/0233398 A1 * | 12/2003 | Kinstler ....................... 709/201 |

FOREIGN PATENT DOCUMENTS

EP 1 069 733 A2 1/2001
WO WO 98/30961 * 7/1998

OTHER PUBLICATIONS

W. Kriesel et al., "ASI im Uberlick", 1994, pp. 11-60.

* cited by examiner

*Primary Examiner*—Khanh Dang
*Assistant Examiner*—Raymond N Phan
(74) *Attorney, Agent, or Firm*—Thelen Reid Brown Raysman & Steiner LLP

(57) ABSTRACT

This invention relates to a deterministic field bus and a process for management of this bus enabling communication of messages between several subscriber stations each comprising at least one controller that generates and decodes the communication protocol, in which an exchange principle is used such that only one subscriber station is activated at any one time, with the others being passive.

8 Claims, 2 Drawing Sheets

DETERMINISTIC FIELD BUS AND PROCESS FOR MANAGING SAME SUCH THAT WHEN TRANSMISSIONS FROM ONE SUBSCRIBER STATION ARE ENABLED TRANSMISSIONS FROM OTHER SUBSCRIBER STATIONS ARE DISABLED

This application claims priority based on France application serial no. 01 12427, entitled "DETERMINISTIC FILED BUS AND PROCESS FOR MANAGEMENT OF SUCH A BUS" by inventor FLEURY Christophe filed on Sep. 27, 2001.

TECHNICAL FIELD

This invention relates to a deterministic field bus and a process for management of such a bus, particularly for avionics.

STATE OF PRIOR ART

The CAN (Controller Area Network) bus as defined in documents references [1] and [2] at the end of the description, forms part of the family of field buses. It is an asynchronous bus with a throughput of up to 1 Mb/s with a physical layer not defined by the standard. Therefore several media may be used including a wire support, optical support, electromagnetic support. These ISO (International Standard Organization) standards describe the CAN bus as being a serial communication protocol that efficiently supports the distribution of commands in real time with a high degree of security. Its preferred applications usually include high throughput network applications with high transmission reliability and based on the low cost multiplexed wiring concept.

In order to make the system elastic, the CAN bus concept offers an addressing principle based on the content of the message itself, and no longer on the source and destination addresses. Messages are broadcast, in other words a message sent by one station is transmitted to all other stations in the network. The transmitted message is then actually selected by an "acceptance" filtering onboard each station.

Many signaling and error detection devices have been developed in order to improve the quality and security of transmission. These devices include acknowledgement, the presence of a CRC (Cyclic Redundancy Code), "stuffing" bit technique, etc. Furthermore, to satisfy "real time" applications, the CSMA/CD+AMP (Carrier Sense Multiple Access/Collision Detection+Arbitration on Message Priority) principle was adopted to eliminate access conflicts to the media. This device operates by means of contention at the bit level itself. In other words, bus access conflicts are managed throughout the duration of the bit.

Heterogeneous equipment is kept compatible by the definition of interconnection standards that define the behavior of each equipment with regard to other equipment. The standard bus architecture, better known under the term OSI model, may be applicable to all bus categories. Some layers are free and are therefore not specified, depending on the bus type. Layers 3 to 6 are free in field buses. This reference model defines 7 layers and specifies the functions of the service rendered for each layer:

| Layer No. | ISO/OSI Model |
|---|---|
| 7 | Application |
| 6 | Presentation |
| 5 | Session |
| 4 | Transport |
| 3 | Network |
| 2 | Data communication |
| 1 | Physical layer |

Layer 7 defines the mechanisms common to distributed applications and the significance of the information exchanged. Layer 6 deals with the syntax of exchanged information such as messages, documents, files, etc. Layer 5 offers means of organizing and synchronizing the dialogue between subscribers. Layer 4 supplies means of transporting information from one end of a bus to the other between two users. It is used as an intermediary between layers dealing specifically with processing (layers 5, 6, 7) and layers dealing with communication (layers 1, 2, 3). Layer 3 transfers data blocks (packets) between two subscribers. Layer 2 controls the reliable transfer of information between adjacent systems (directly connected to each other). Layer 1 transmits bits in a data block and specifies the mechanical and electrical rules, and bit exchange protocols; it offers means of setting up a physical connection between two items of equipment.

These layers communicate with equivalent layers in other equipment through standard protocols. Layers communicate with their immediately adjacent layers through hardware or software interfaces, inside a single equipment.

The CAN protocol only covers all of the entire layer 2 and a large part of the first of the seven layers of the ISO/OSI model.

There is an arbitration mechanism on the CAN bus; if two or more units start simultaneously when the bus is free, there is a bus conflict that is solved by a non-destructive bit by bit arbitration throughout the contents of the identifier (CSMA/CD+AMP principle). This arbitration mechanism ensures that there will be no loss of time or data.

When the arbitration phase is being carried out, each sender compares the level of the bit transmitted on the bus with the level of the bit that it is supposed to transmit itself. If these levels are identical, the node continues to send. When a recessive level (logical level '1') is sent and a dominant level (logical level '0') is observed on the bus, the unit considered loses the arbitration and it has to stop transmitting and not send any more bits. A new attempt to transmit the message takes place at the end of the current frame and until the transmission is successful. Therefore, this arbitration principle defines a priority for bus access; the unit with the highest priority message (based on the binary contents of its identifier) gains access to the bus and transmits its message. In the example illustrated in FIG. 1, subscribers A1 and A2 loose the arbitration at 10; therefore, they do not have priority over subscriber A3 that gains the bus and transmits its message.

Many error signaling and detection devices have been developed to increase the quality and security of the transmission, particularly including the acknowledgement principle, the CRC and the concept of the "stuffing" bit. We will look at each of these devices in turn.

All receivers must send an acknowledgement message when they have not detected any error in the message. Therefore, they superpose a dominant bit on the recessive bit already present in the bit called the "ACK slot" in the acknowledgement field. Otherwise, if the message is considered as being invalid, the receiver will not return an acknowledgement. Furthermore, to satisfy the CAN protocol, the receiver is obliged to signal the error by transmitting an error frame.

To protect the information transiting on the bus, a CRC (Cyclic Redundancy Code) is introduced into the frame itself. This is a code that the sender calculates during the emission and the receiver calculates during the reception. The two results are compared and if they are not the same, an error is introduced that is automatically signaled by the receiver.

Information exchanged by subscribers is digital. It is coded in NRZ (Non Return to Zero) so that it can be transited on the bus. In other words, there is no return to zero between two bits with the same value. Since the bit is coded in NRZ, it is possible that a particular message contains a large number of bits with the same value and may make one or several stations believe that there is a problem on the network. The concept of the "stuffing" bit consists of the sender inserting an additional bit (that will be eliminated by the receiver) after 5 successive bits with the same value. The value of this stuffing bit is opposite to the value of the five other bits. This process increases the security of the message during transport on the bus.

All information transported on the bus is sent in the form of frames. A frame is a sequence of bits organized in different fields.

There are four source of frames:
Data frame
Request frame
Error frame
Overload frame The data frame transports the data. It comprises seven fields including:
Start of Frame or SOF
Arbitration field
Control field
Data field
CRC sequence
ACKnowledgement field
End of Frame or EOF and is then followed by an eighth field called the Interframe field.

Data transmission may be affected by errors on the bus disturbing circulation of frames. Several types of error can occur:
At the physical layer level:
  bit affected by errors (for example by parasites)
  "stuffing bit" error: violation of the "stuffing bit" rule between the SOF and the CRC.
At frame level:
  Acknowledgement errors: no dominant bit during the "ACK slot" bit
  CRC errors: disagreement between the value of the CRC calculated by the receiver and the value of the CRC sent by the sender
At the frame structure level (data not in place):
  "CRC delimiter" error
  "ACKnowledge delimiter" error
  "End of frame" error
  "Error delimiter" error
  "Overload delimiter" error In all cases, the presence of errors is signaled by an error frame generated on the bus.

By sending a request frame, a node signals to the other nodes present on the network that it would like to receive data from them in the form of a corresponding data frame. The request frame and the associated data frame are identified by the same identifier. If two data frames are sent at the same time, the data frame takes priority over a request frame.

The request frame is composed of six fields as follows:
Start of Frame or SOF
Arbitration field
Control field
CRC Sequence
ACKnowledgement field
End of Frame or EOF and is then also followed by an "Interframe" field.

The error frame is composed of two fields:
Error flags field: consisting of the superposition of error flags to which the different stations present on the bus contributed. These error flags may be of two different types depending on the error type (defined later):
  six dominant bits in the case of an active error
  six recessive bits in the case of a passive error.
Field delimiter: composed of eight consecutive recessive bits.

It is then followed by the interframe field defined above.

The purpose of the overload frame is to indicate that a station is overloaded. It may be emitted when a receiver requires a certain time to accept the next frame (data or request), or when a dominant bit is detected during the intermission phase. Only two consecutive overload frames are possible, to avoid blocking the bus indefinitely. This frame only comprises two fields:
Overload flags field: composed of six consecutive dominant bits
Field delimiter: composed of eight consecutive recessive bits.

There are many components that can be used to create solutions operating under the CAN protocol and capable of transporting frames on different media. The components of the CAN bus can be subdivided according to the four main classes with the following functions:
Protocol managers (controllers): the function of these managers is to generate and decode the protocol. They are usually incapable of operating alone and must be controlled by a microcontroller.
Microcontrollers with protocol managers onboard: they are made to reduce the cost of making the two components (protocol manager and microcontroller).
Line control interfaces (Drivers): these make up the part controlling the link between the protocol manager and the support.
SLIO (Serial Link Input/Output) circuits these are very simple circuits, in other words without any onboard CPU or microcontroller interface. Their function is to carry out mainly input/output tasks, either digital or analogue, and their function on the bus is in slave mode (can be queried) only.

There are several disadvantages with this type of CAN bus.

Firstly, it has a theoretical limitation in terms of throughput and length. The arbitration and acknowledgement operating principle requires a timed combination of frame bits output from the different subscribers.

Various additional limitations have also been observed in practice:

Mismatch of impedance on driver circuits transmitting on the bus (signal reflection), Variation of this mismatch due to multiple collision conditions on the bus, Possible degradation of the signal shape due to capacitive charges, in aeronautics carried by lightning protection.

Therefore the transmission quality on the line is degraded, reducing the theoretical performances for use at limiting throughput/length conditions.

Therefore, this type of bus is more suitable for "Automobile market" type uses, for which communication constraints are not severe:

bus a few meters long
throughput 250 kbits/s,
no EMI+lightning protection circuits, and which is therefore not sensitive to mismatch problems related to the inherent characteristics of commercially available components.

The purpose of the invention is to extend the use of such a bus to the avionics industry by improving its performances:

control the line impedance (only one active subscriber),
bus length limited only by the attenuation of the support and the connections,
possible speed 1 Mbit/s independently of the bus length.

PRESENTATION OF THE INVENTION

This invention proposes a process for management of a determinist field bus enabling communication of messages between several subscriber stations each comprising at least one controller responsible for generating and decoding the communication protocol, characterized in that emissions from one of the subscriber stations onto the bus are enabled and in that emissions from the other stations onto the bus are disabled for an exchange principle in which only one subscriber station is active at any one time, the others being passive. The terms "active" and "passive" should be understood in the electrical sense on the bus.

Advantageously, this process does not use the bit juxtaposition principle.

The following mechanisms can be used in this process:

monitoring of the output level from each controller,
use of an authorization window for sending responses managed locally at slave subscriber stations,
isolation of subscriber stations from the bus if they are defective,
multi-sampling of the bit greater than 3 (which is the same as the standard CAN bus).

This invention also proposes a deterministic field bus comprising controllers, line driver circuits and a line itself, carrying communication of messages between several subscriber stations, characterized in that it includes a management device comprising means of enabling transmissions on the bus from one of the subscriber stations and means of disabling transmissions on the bus from the other stations, for an exchange principle in which a single subscriber station is active at any one time and the others remain passive.

In comparison with the CAN bus, this bus has the following advantageous characteristics:

elimination of bit juxtapositions:
no more acknowledgement
no more arbitration
Maintain functional frames:
data frames
request frames Elimination of non-functional frames:
no more error frames sent by a subscriber in reception
no more overload frames sent on the bus
Unchanged frame format:
use of commercially available analysis tools
Unchanged security functions:
data checking with CRC
bit coding with "stuffing" bits
Unchanged physical support:
tested physical behavior
performance improved in terms of throughput/length/number of subscribers.

In a first embodiment, each subscriber station comprises two associated controllers.

This first mode has the following advantageous characteristics:

self-checking of data sent on the bus
automatic local acknowledgement
simple usage with CAN components available on the market making it possible to change to listening mode only.

In a second embodiment, each subscriber station comprises logical means placed between a controller and the bus driver, forming security mechanisms enabling:

monitoring of the configuration at the controller output,
use of a window to authorize sending responses managed locally at slave subscriber stations,
isolation of subscriber stations from the bus if they are defective.

This second embodiment has the following advantageous characteristics:

self checking of data sent on the bus,
automatic local acknowledgement,
use of all CAN controller types available on the market,
isolation of defective subscribers.

In a third embodiment, each subscriber station has a dedicated component performing the following functions:

addition of security mechanisms:
use of a window authorizing sending responses managed locally at slave subscriber stations,
isolation of subscriber stations on the bus if the bus is defective.
Multi-sampling of the bit greater than 3 (like the standard CAN bus).

This third mode has the following advantageous characteristics:

smaller hardware architecture/low cost,
isolation of defective subscribers,
improvement of bit synchronizations,
better immunity to external aggressions.

This type of deterministic field bus may advantageously be used in avionics.

The invention can be used to satisfy communication needs with severe constraints, namely:

high throughput (above a few hundred kbits/s),
long bus length (more than 100 m),
guaranteed determinism (perfect control over the moment at which the data must be transmitted).

This type of architecture overcomes the constraints of the CAN bus mentioned above.

If only one subscriber is active on the bus, arbitration and multiple acknowledgement with the other subscribers are no longer necessary. Length limits related to the nature of the support and component performances are perfectly compatible with requirements in the aeronautical environment. For example, CAN type driver circuits or RS 485 type driver circuits can be used in the case of an electrical connection, or inexpensive components can be used for an optical link. In this case, lightning—EMI protection circuits are no longer necessary:

the solution of problems related to matching subscribers to the bus is very much simplified, from a deterministic point of view, in the first embodiment, a network "tandem" controller is master of exchanges within its network and then acts as the bus master by distributing speech times to other subscribers, the hardware used may be composed exclusively of CAN bus components used at the present time and therefore benefit from cost and multisource advantages, mechanisms to increase the security of messages specific to the conventional deterministic field protocol remain active ("stuffing" bits, CRC, acknowledgement, etc.).

DETAILED PRESENTATION OF EMBODIMENTS

The invention relates to a deterministic field bus comprising controllers, line driver circuits and the actual line providing communication of messages between several subscriber stations, and which comprises a management device including means of validating transmissions on the bus from one of the subscriber stations and means of disabling data sent on the bus from the other stations, following an exchange principle in which only one subscriber station is active at any one time while the others remain passive. According to the management process for this bus, the services offered by the CAN communication protocol are used but the basic principle of this protocol is no longer used (collision management and acknowledgement), while the bus controllers are kept.

In a first embodiment of the invention, any subscriber to the bus is equipped with two associated bus controllers in "tandem".

Figure 1:
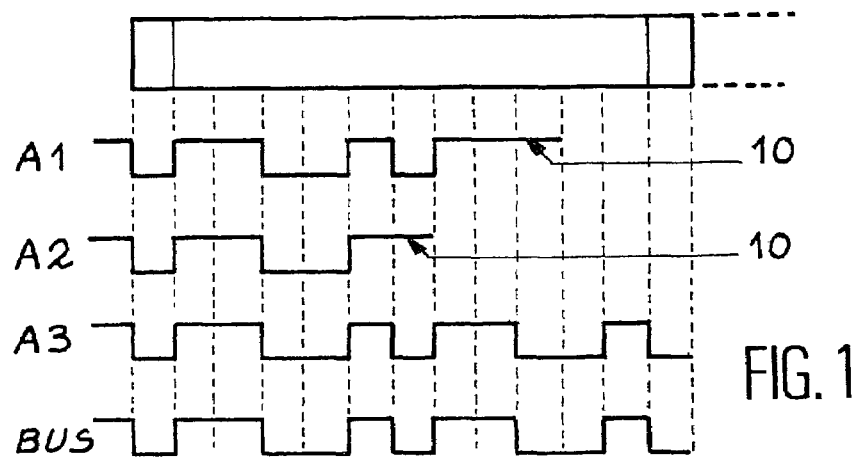
FIG. 1 illustrates the arbitration principle of a CAN bus.
Figure 2:
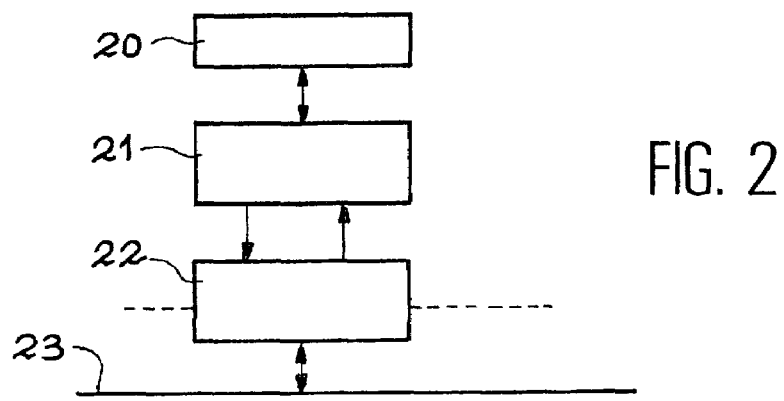
FIG. 2 illustrates the general architecture of a conventional CAN subscriber.

As illustrated on FIG. 2, the general architecture of a conventional CAN subscriber is based on a microcontroller 20 that carries out the application processing, a protocol controller 21 that is responsible for bus management in accordance with the CAN protocol, and a line interface 22 that shapes the electrical signal in accordance with the recommendations of standards references [1] and [2]; the CAN bus being reference 23.

Figure 3:
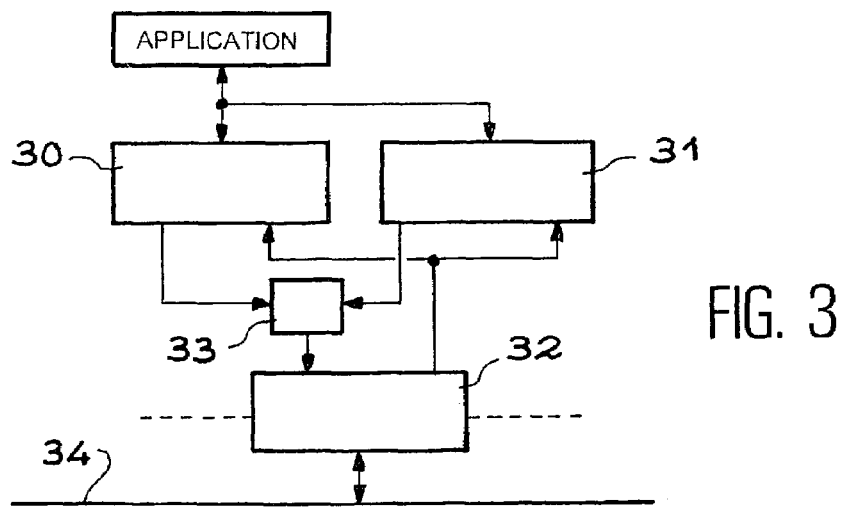
FIG. 3 illustrates a first embodiment of the invention.

On the other hand, in the first embodiment illustrated on FIG. 3, the general architecture of a subscriber requires that two protocol controllers 30, 31 are used. To prevent the duplication of line interfaces and connections to the bus, a line interface 31 common to the two controllers is used, the transmission signal passes through an elementary logical gate 33 (AND gate) in order to manage access for sending, the loop being made by the line interface. The bus is reference 34.

At any given moment, there is only one sending controller on the bus and the others are listening. This sending controller acts as a bus controller managing exchanges. It works in "normal" mode while sending and the other controllers work in "passive" mode in reception. The use of two controllers in "tandem" makes it possible to immediately check that data is sent correctly on the bus, confirming every transmission that is correctly sent by an acknowledgement. After data has been sent on the bus, the bus controller returns to passive mode.

Two cases can arise at the end of this send:

the only purpose of sending the frame was to provide information to other subscribers ("broadcast" type send), the transmission was actually a query to another subscriber, and a reply from this other subscriber is necessary.

If the transmission is a query to a single subscriber that requires a response from this subscriber, this subscriber is not in a position to reply (it is in passive mode). At a higher level, at the application level, a check is made that the message is actually addressed to it. In this case, the application reconfigures its controller in "normal" mode only for the time necessary for the reply. This reply controller is also in "tandem", so that it can be checked that data are correctly sent on the bus. The bus controller is then capable of receiving the reply, so that it can then question another subscriber or inform the other subscribers.

In this embodiment, there is no need for arbitration to manage conflicts since there are no more conflicts. Operation is in question/answer mode. Time coincidences of acknowledgement bits are useless (acknowledgement managed locally by controllers "in tandem").

In a second embodiment, the advantages of the first embodiment are retained (performances related to the master/slave protocol), but the second controller is replaced by a dedicated logic that is inserted between the controller and the driver circuit performing the same functions:

disable transmissions on the bus when the subscriber is in passive mode (in reception only), automatic acknowledgement for transmission by the subscriber (local acknowledgement), transmission of the acknowledgement on the bus at the end of a frame in reception prohibited, elimination of the transmission of error frames on the bus when the subscriber is in reception, and also:

addition of security mechanisms, monitoring the configuration of the output level (Tx) from the controller, window for authorization to send responses managed locally at slave subscribers, subscriber isolated from the bus if it is defective.

Therefore the second controller of the first embodiment is eliminated and an arbitrary first controller is used. The time to change back from passive mode <=> active mode is no longer used. The application layer no longer manages the second controller. Disturbances on the bus are limited if there is a subscriber failure.

Figure 4:
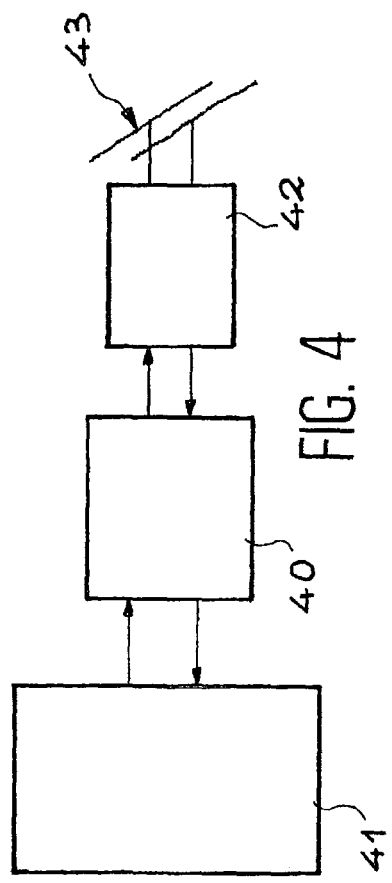
FIGS. 4 and 5 illustrate a second embodiment of the invention.

The dedicated logic is composed of an additional component; an MS-CAN or "master-slave" type manager 40. As shown on FIG. 4, this manager 40 is a standalone programmable circuit, for example an FPGA type circuit inserted between the controller 41 and the "driver" circuit 42 (transceiver) of the CAN bus 43. It controls access to the master bus and slaves to assign the right to write to one only at any onetime. This principle prevents collisions on the bus and prohibits acknowledgements.

Since the CAN protocol imposes automatic retransmission of an unacknowledged frame on the controller 41, the manager 41 must supply the acknowledgement bit to the controller 41 locally.

Figure 5:
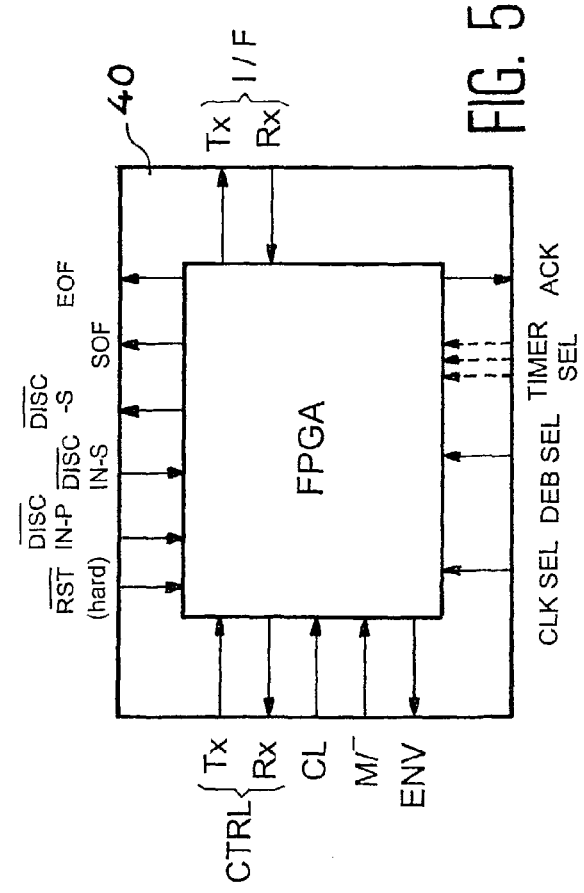

This manager 40 is defined based on the functional block diagram illustrated on FIG. 5, for which the inputs or outputs have the following meanings:

RST: reset
DISC IN-P: command to disconnect the line interface controller on pulse
DISC IN-S: command to disconnect the line interface controller on state
DISC-S: state of manager (disconnection or on line)
SOF: start of frame (SOF bit)
EOF: end of frame (last bit in the EOF field)
ACK: acknowledgement (ACK bit)
ENV: frame envelope, from the SOF until the last recessive bit in the frame (EOF)
CLK: controller clock
CLK SEL: select clock frequency: 16 or 24 MHz (SJA1000 at 16 or 24 MHz, Intel 82527 at 16 MHz)
TIMER SEL: select authorized response times timers T and T' (2×8 bits)
DEB SEL: throughput selection (500 kbps or 1 Mbps)
Tx, Rx to I/F: input/output to electrical line interface (for example 82C251)
Tx, Rx controller (CTRL): Tx output, Rx input of the controller
M/S: operation configuration input in "Master" mode or in "Slave" mode.

The function of the dedicated logic is to enable a master/slave operating mode as far as the lowest level of the layers while keeping the structure of CAN frames. The fact that there must only be a single active subscriber on the bus at any one moment means that there are no longer multiple arbitrations and acknowledgements between subscribers. A master subscriber (alone or in redundancy by pairs on the bus) puts itself into active mode to send a single request on the bus, and it transmits to all slave subscribers that are passive (they do not acknowledge this frame). This frame is validated and acknowledged locally by the dedicated logic at the master subscriber and is addressed to a slave subscriber. The master subscriber puts itself into passive mode for as long as necessary for the response. The slave subscriber concerned puts itself into active mode to reply (within an authorized time window) and then goes back once again to passive mode. This reply is also validated and acknowledged locally by dedicated logic at the slave subscriber and is received by the master subscriber.

In a third embodiment, a dedicated component is used that carries out the following functions:
  inhibition of transmissions on the bus when the subscriber is in passive mode,
  addition of security mechanisms:
    use of a window to authorize the transmission of responses managed locally at slave subscriber stations,
    isolation of subscriber stations from the bus if the bus is defective,
  multi-sampling of the bit.

The dedicated component (or the dedicated controller) replaces a conventional CAN controller.

This dedicated component 50 will make the interface between the application layer 51 and the physical support of the bus 52 through the line "driver".

It must support the following four functions:

send 54: transfer application data to the bus in the form of frames,
reception 54: recovery of frames on the bus to extract the application data,
parameter setting 53: dialogue interface with the application layer to set controller parameters,
monitoring 56: check that the physical layer is operating correctly.

Figure 6:
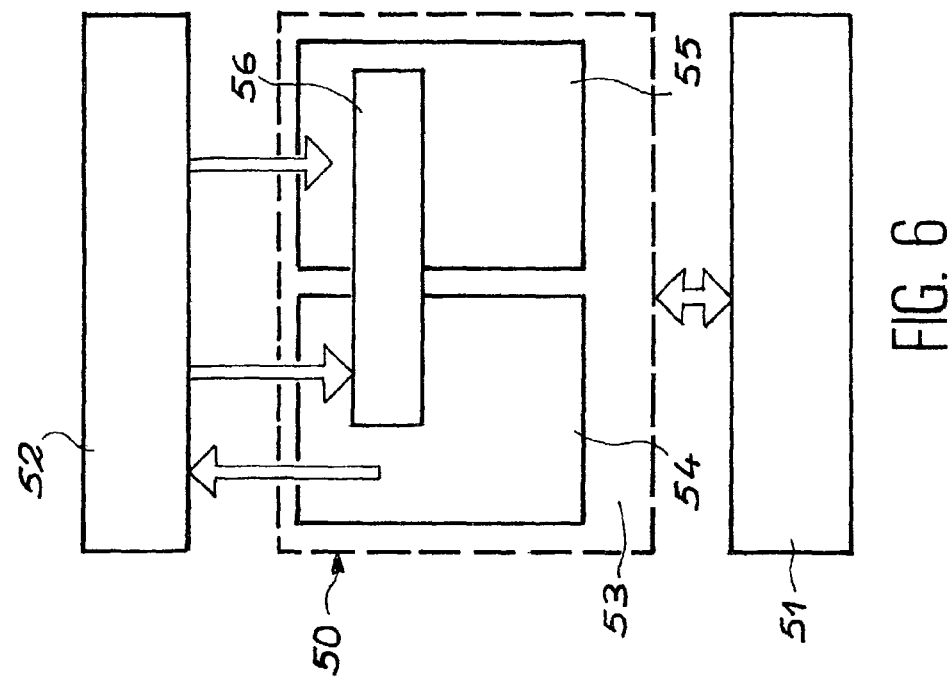
FIG. 6 illustrates a third embodiment of the invention.

These functions may be executed in parallel or sequentially. The diagram in FIG. 6 illustrates the different cases:
  the parameter setting function 53 must be active and available at all times with regard to the application layer 51 regardless of the activation state of other functions.
  send 54 and reception 55 functions are activated exclusively (the controller either sends or receives).
  the monitoring function 56 is activated at the request of the transmission layer (to check the sent frame) and the reception layer, to check the quality of the received frame.

The dedicated component may be made in the form of an ASIC (Application Specific Integrated Circuit) specific component, or a microprogrammed controller.

REFERENCES

[1] ISO Standard 11519
[2] ISO Standard 11898

The invention claimed is:

1. Process for management of a deterministic field bus providing communication of messages between several subscriber stations, each comprising at least one protocol controller responsible for generating and decoding a communication protocol, wherein at any moment:
  transmissions from a first one of the subscriber stations onto the bus are enabled, then only one protocol controller is a sending protocol controller,
  transmissions from other subscriber stations onto the bus are disabled, the protocol controllers of these subscriber stations are listening, the sending controller acting as a bus controller managing exchanges on the bus, which works in "active" or "normal" mode while sending, the other controllers working in "passive" mode in reception, wherein there is no timed combination of frame bits output from the different subscribers.

2. Process according to claim 1, in which the configuration of the output level from each controller is monitored.

3. Process according to claim 1, in which when a first controller which was in "passive" mode has to reply a second controller which was in "active" mode for as long as necessary for the response, the first controller puts itself in "active" mode to reply within an authorized time window and then goes back again to the "passive" mode.

4. Process for management of a deterministic field bus providing communication of messages between several subscriber stations, each comprising at least one protocol controller responsible for generating and decoding a communication protocol, wherein at any moment:
  transmissions from a first one of the subscriber stations onto the bus are enabled, said first subscriber station being in an active state, then only one protocol controller of this first subscriber station being a sending protocol controller,
  transmissions from other subscriber stations onto the bus are disabled, said other subscriber stations being in a passive state, the protocol controllers of these subscriber stations being listening, the sending controller acting as a bus controller managing exchanges on the bus, which works in "active" or "normal" mode while sending, the other controllers working in "passive" mode in reception, wherein subscriber stations are isolated from the bus if they are defective.

5. Process according to claim 1, in which, in a data block containing multiple bits, every third bit is multi-sampled.

6. Deterministic field bus comprising a line providing communication of messages between several subscriber stations, each comprising at least one protocol controller responsible for generating and decoding a communication protocol, which comprises a management device including means of validating transmissions from a first one of the subscriber stations on the bus, and means of disabling transmissions from other stations onto the bus to give an exchange principle in which at any one time only the first subscriber station is sending, while the other subscriber stations remain receiving, wherein each subscriber station comprises logical means placed between a controller and the corresponding bus driver circuit, comprising:

means for monitoring the configuration of the controller output level, means for authorizing sending responses by slave subscriber stations, means for isolating subscriber stations from the bus if the bus is defective.

7. Bus according to claim 6, in which each subscriber station comprises two associated controllers.

8. Deterministic field bus comprising a line providing communication of messages between several subscriber stations, each comprising at least one protocol controller responsible for generating and decoding a communication protocol, which comprises a management device including means of validating transmissions from a first one of the subscriber stations on the bus, and means of disabling transmissions from other stations onto the bus to give an exchange principle in which at any one time only the first subscriber station is sending, while the other subscriber stations remain receiving, wherein each subscriber station comprises a dedicated component performing the following functions:

security mechanisms enabling:

use of a window to authorize sending responses managed locally in slave subscriber stations, isolation of subscriber stations from the bus if the bus is defective, Multi-sampling of bits.

* * * * *